US011502970B2

(12) United States Patent
Sakata et al.

(10) Patent No.: US 11,502,970 B2
(45) Date of Patent: Nov. 15, 2022

(54) NETWORK SERVICE MANAGEMENT DEVICE, NETWORK SERVICE MANAGEMENT METHOD, AND NETWORK SERVICE MANAGEMENT PROGRAM

(71) Applicant: Nippon Telegraph and Telephone Corporation, Tokyo (JP)

(72) Inventors: Kosuke Sakata, Tokyo (JP); Yuji Soejima, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/270,638

(22) PCT Filed: Aug. 21, 2019

(86) PCT No.: PCT/JP2019/032638
§ 371 (c)(1),
(2) Date: Feb. 23, 2021

(87) PCT Pub. No.: WO2020/045189
PCT Pub. Date: Mar. 5, 2020

(65) Prior Publication Data
US 2021/0344611 A1 Nov. 4, 2021

(30) Foreign Application Priority Data
Aug. 27, 2018 (JP) .............................. JP2018-158781

(51) Int. Cl.
*H04L 47/74* (2022.01)
*H04L 41/5019* (2022.01)
(Continued)

(52) U.S. Cl.
CPC ........ *H04L 47/748* (2013.01); *H04L 41/5019* (2013.01); *H04L 41/5041* (2013.01); *H04L 47/72* (2013.01); *H04L 47/762* (2013.01)

(58) Field of Classification Search
CPC ............... H04L 47/748; H04L 41/5019; H04L 41/5041; H04L 47/72; H04L 47/762
See application file for complete search history.

(56) References Cited

U.S. PATENT DOCUMENTS 10,606,718 B1 * 3/2020 Sandlerman ............ G06F 11/20
2017/0257267 A1 * 9/2017 Nakatsugawa ..... H04L 12/4641
(Continued)

FOREIGN PATENT DOCUMENTS

JP 2017-143452 8/2017

*Primary Examiner* — Glenton B Burgess
*Assistant Examiner* — Jihad K Boustany
(74) *Attorney, Agent, or Firm* — Fish & Richardson P.C.

(57) ABSTRACT

[Problem] A lead time for providing a network service can be shortened.
[Solution] A network service management apparatus 100 that uses resources included in a network functions virtualization infrastructure 140 to provide a network service includes an orchestrator 110 that defines resources that satisfy a resource requirement of a virtual network function constituting the network service and are allocated to the virtual network function, and reserves the resources, and a virtualized infrastructure manager 130 that secures the reserved resources, activates the virtual network function on the secured resources, and generates the network service. When the securing of the reserved resources fails, the orchestrator 110 re-reserves resources to replace the reserved resources, and the virtualized infrastructure manager 130 secures the re-reserved resources, and activates the virtual network functions on the secured resources.

8 Claims, 10 Drawing Sheets

(51) Int. Cl.
    *H04L 41/5041*     (2022.01)
    *H04L 47/72*     (2022.01)
    *H04L 47/762*     (2022.01)

(56) References Cited

U.S. PATENT DOCUMENTS

| | | |
|---|---|---|
| 2018/0219794 A1 | 8/2018 | Patil et al. |
| 2019/0052528 A1* | 2/2019 | Yoshimura .......... H04L 41/0806 |
| 2021/0149699 A1* | 5/2021 | Celozzi ................ G06F 9/45558 |
| 2021/0288827 A1* | 9/2021 | Celozzi ................ H04M 15/00 |

* cited by examiner

NETWORK SERVICE MANAGEMENT DEVICE, NETWORK SERVICE MANAGEMENT METHOD, AND NETWORK SERVICE MANAGEMENT PROGRAM

CROSS-REFERENCE TO RELATED APPLICATIONS

This application is a National Stage application under 35 U.S.C. § 371 of International Application No. PCT/JP2019/032638, having an International Filing Date of Aug. 21, 2019, which claims priority to Japanese Application Serial No. 2018-158781, filed on Aug. 27, 2018. The disclosure of the prior application is considered part of the disclosure of this application, and is incorporated in its entirety into this application.

TECHNICAL FIELD

The present invention relates to a network service management apparatus, a network service management method, and a network service management program that construct and provide network services.

BACKGROUND ART

Network functions such as firewalls and intrusion detection systems, which were often constructed and provided on dedicated hardware, can also be provided as virtual machines on a general-purpose physical server due to the progress of virtualization technologies and the enhancement of hardware performance. The network functions are provided as virtual network functions using the virtual machines, and thus, network service operators have advantages of being able to deploy new services on the market over a short period of time, to reduce apparatus cost and power consumption by optimizing the use of the resources, and to improve automated operation efficiency.

The network service operators receive service requests from customers, generate network services, and provide the network services to the customers. The network service consists of one or more virtual network functions. It is important to shorten a time (lead time) required to generate the virtual network functions in order to acquire customers that desire to immediately use the network services. The lead time is directly related to network service quality in auto-healing or auto-scaling.

To generate the network services (hereinafter, also referred to as services), it is necessary to secure resources on a network functions virtualization infrastructure such as the virtual machines used by the virtual network functions constituting the services and virtual networks that connect the virtual machines. When the securing of the resources fails, service generation processing is repeatedly executed, and thus, the lead time becomes long. A cause of the resource securing failure includes resource conflicts with other services, failures of resources (apparatuses), resource deficiencies, and the like. In particular, in large-scale services, it is difficult to secure all the resources due to strict requirements of the required resources or a large number of the virtual network functions constituting the service.

For such problems, the technology described in Patent Literature 1 attempts to secure the resources by reserving the resources.

CITATION LIST

Patent Literature

Patent Literature 1: JP 2017-143452 A

SUMMARY OF THE INVENTION

Technical Problem

When a request of a service is received from the user (customer) and the requested service is generated, the management apparatus described in Patent Literature 1 generates the service on resources by reserving resources of a server apparatus and resources of a network apparatus required for providing the service, generating an application from the reserved resources of the server apparatus and generating network connection from the reserved resources of the network apparatus. However, the management apparatus disclosed in Patent Literature 1 does not describe countermeasures when a failure occurs in the reserved resource and the service cannot be generated.

As the countermeasures within the described range, there is a technology in which, when the service generation fails, the management apparatus releases all the reserved resources and notifies the user of the service generation failure, and then the user re-requests the service. However, the user needs to wait for the service to be provided while the service request is repeated, and thus, the service satisfaction of the user decreases.

When the service is re-requested, the management apparatus re-reserves the required resource, and generates the service. However, in such countermeasures, resources that could be reserved once is already reserved for another service and cannot be reserved a second time, and further because all of the replacement resources (necessary to satisfy the service requirements) are used by another service and there is no available (free) resources (resource deficiencies) there may occur a case where reservation fails. At this time, the management apparatus cannot provide the service until the resources are free, and thus, the lead time becomes long. Also, when the resources on the network functions virtualization infrastructure required for the service requested by the user are deficient, the management apparatus cannot provide the service until the resources are free, and thus, the lead time becomes long.

It is desirable to shorten the lead time by reserving the resources while coping with the repetition of the service requests and the resource deficiencies and generating the services. The present invention has been made in view of such a background, and an object of the present invention is to shorten a lead time for providing a network service.

Means for Solving the Problem

To resolve the above-described problems, according to the invention of a first aspect, there is provided a network service management apparatus that uses resources included in a network functions virtualization infrastructure to provide a network service includes an orchestrator configured to define resources that satisfy a resource requirement of a virtual network function constituting the network service and are allocated to the virtual network function, and make a first reservation of the resources that are defined, and a virtualized infrastructure manager configured to secure first resources including the resources reserved by the first reservation, activate the virtual network function on the first resources that are secured, and generate the network service, in which the orchestrator is configured to, when there are resources for which the virtualized infrastructure manager fails to secure among the resources reserved by the first reservation, define, regarding a virtual network function to which the resources that are failed to be secured are allocated, a new instance of resources that satisfy a resource requirement of the virtual network function to which the resources that are failed to be secured are allocated and are allocated to the virtual network function to which the resources that are failed to be secured are allocated, and make a second reservation of the new instance of the resources, and the virtualized infrastructure manager is configured to secure second resources including the resources reserved by the first reservation other than the resources that are failed to be secured and the resources reserved by the second reservation, activate a virtual network function on the second resources that are secured, and generate the network service.

According to the invention of a seventh aspect, there is provided a network service management method of a network service management apparatus that uses resources included in a network functions virtualization infrastructure to provide a network service includes, by the network service management apparatus, defining resources that satisfy a resource requirement of a virtual network function constituting the network service and are allocated to the virtual network function, and making a first reservation of the resources that are defined, by the network service management apparatus, securing first resources including the resources reserved by the first reservation, activating the virtual network function on the first resources that are secured, and generating the network service, by the network service management apparatus, when there are resources that are failed to be secured among the resources reserved by the first reservation, defining, regarding a virtual network function to which the resources that are failed to be secured are allocated, a new instance of resources that satisfy a resource requirement of the virtual network function to which the resources that are failed to be secured are allocated and are allocated to the virtual network function to which the resources that are failed to be secured are allocated and making a second reservation of the new instance of the resources, and by the network service management apparatus, securing second resources including the resources reserved by the first reservation other than the resources that are failed to be secured and the resources reserved by the second reservation, activating a virtual network function on the second resources that are secured, and generating the network service.

With such a configuration, the network service management apparatus can provide the network service by re-allocating the resource to only the virtual network function to which the resource that can be reserved but cannot be secured is allocated, and re-reserving the resource, and activating all the virtual network functions. The secured resources allocated to and reserved for the virtual network functions are maintained in the reserved state without being released, and thus, these resources are not allocated to the virtual network functions of another network service. Thus, the network service management apparatus can use a replacement resource to provide the service without failing in a related-art situation in which the generation of the network service fails, and can shorten the lead time for providing the network service.

The invention according to a second aspect provides the network service management apparatus according to the first aspect, in which the orchestrator or the virtualized infrastructure manager is configured to cancel a reservation of the resources for which the virtualized infrastructure manager fails to secure.

With such a configuration, the network service management apparatus can newly allocate the resource to the virtual network function after the resource on the network functions virtualization infrastructure returns to an available state.

The invention according to a third aspect provides the network service management apparatus according to the first or second aspect, in which the orchestrator is configured to, when there are resources for which the virtualized infrastructure manager fails to secure among the resources reserved by the second reservation, repeat a definition of the new instance of the resources and a reservation of the new instance of the resources until the virtualized infrastructure manager secures third resources, and the virtualized infrastructure manager is configured to activate a virtual network function on the third resources that are secured, and generate the network service.

With such a configuration, even when the resource which is allocated to and is re-reserved for the virtual network function cannot be secured and cannot be used, the network service management apparatus can activate the virtual network function and use another resource on the network functions virtualization infrastructure to generate the network service.

The invention according to a fourth aspect provides the network service management apparatus according to any one of the first to third aspects, in which the orchestrator is configured to, when there are no resources that satisfy the resource requirement of the virtual network function constituting the network service and are allocated to the virtual network function constituting the network service in the first reservation or the second reservation, change the resource requirement of the virtual network function that does not have resources to be allocated according to a predetermined adjustment policy, and define resources to be allocated to the virtual network function that does not have resources to be allocated.

With such a configuration, even when there is no resource satisfying the resource requirements of the virtual network function on the network functions virtualization infrastructure, the network service management apparatus can provide the network service by changing to relax the resource requirements according to the adjustment policy and allocating the resource to the virtual network function. It is not necessary to wait for the activation of the virtual network function until the resource satisfying the resource requirements is available, and it is possible to shorten the lead time for providing the network service.

The invention according to a fifth aspect provides the network service management apparatus according to the fourth aspect, in which the orchestrator is configured to switch, depending on a situation of the resources included in the network functions virtualization infrastructure, between a plurality of adjustment policies for which values after performance and/or capacity of resources included in the resource requirement of the virtual network function constituting the network service are changed are different.

With such a configuration, when the amount of free resources on the network functions virtualization infrastructure is small, the network service management apparatus can switch to the adjustment policy that changes the resource requirements of the virtual network function to reduce the amount of resources to be allocated. Thus, the network service management apparatus can activate more virtual network functions and can provide more services compared to a case where the adjustment policy is fixed among less free resources.

The invention according to a sixth aspect provides the network service management apparatus according to the fourth or fifth aspect, in which the orchestrator is configured to, regarding a virtual network function activated in fallback state that indicates a virtual network function to which resources are allocated based on the resource requirement that is changed, when new resources indicating resources that satisfy the resource requirement prior to change of the virtual network function activated in fallback state are allocable to the virtual network function activated in fallback state, reserve the new resources, and the virtualized infrastructure manager is configured to secure the new resources, activate a virtual network function on the new resources that are secured, and replaces the virtual network function activated in fallback state with the virtual network function activated on the new resources.

With such a configuration, the network service management apparatus can provide the network service by allocating the resource satisfying the original resource requirements to the virtual network function at a point of time at which the resource satisfying the original resource requirements prior to change is available for the network service including the virtual network function activated in fallback state to which the resource of the resource requirements changed to relax is allocated. The service user can use the network service having the original performance and quality by allocating the resource satisfying the original resource requirements to the virtual network function at a point of time at which the resource on the network functions virtualization infrastructure is free without stopping and re-requesting the service for the network service that does not satisfy the requirements.

The invention according to an eighth aspect provides a network service management program causing a computer to execute the network service management method according to the seventh aspect.

By doing this, it is possible to cause a typical computer to execute the network service management method according to the seventh aspect.

Effects of the Invention

According to the aspects of the present invention, it is possible to shorten the lead time for providing the network service.

DESCRIPTION OF EMBODIMENTS

Existing Network Service Generation

Prior to describing a network service management apparatus (hereinafter, also simply referred to as a management apparatus) which is a configuration (embodiment) for implementing the present invention, network service generation processing and problems according to the technology described in Patent Literature 1 and generation processing and effects according to the present invention will be described.

Figure 1:
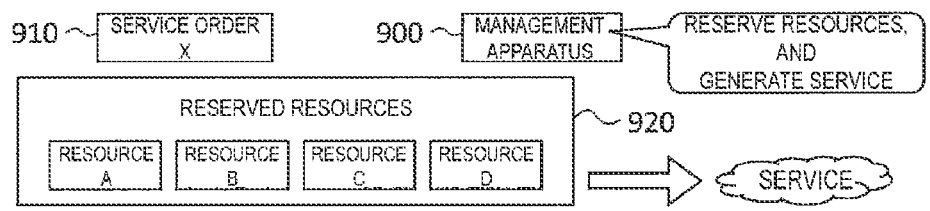
FIG. 1 is a diagram for describing problems of network service generation processing in an existing management apparatus as a comparative example.
Figure 1:
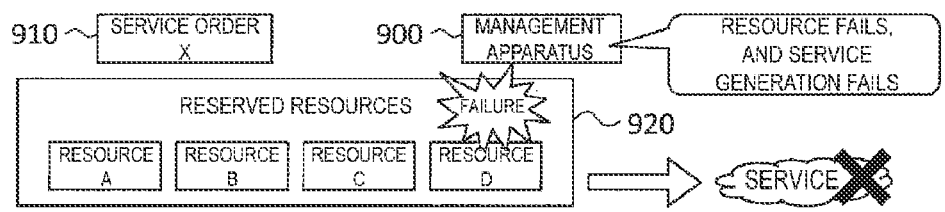
Figure 1:
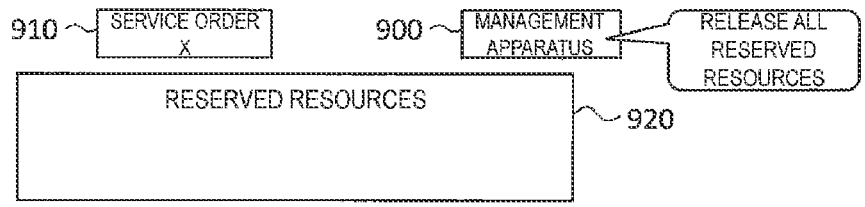
Figure 1:
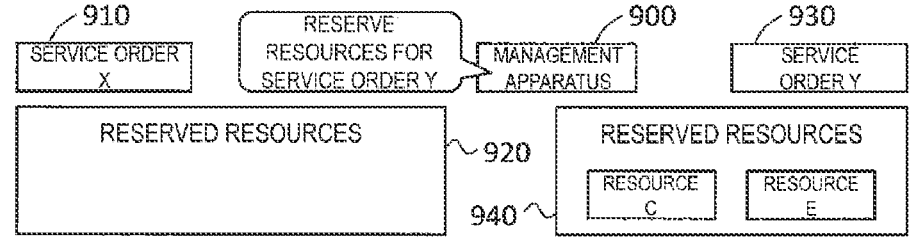
Figure 1:
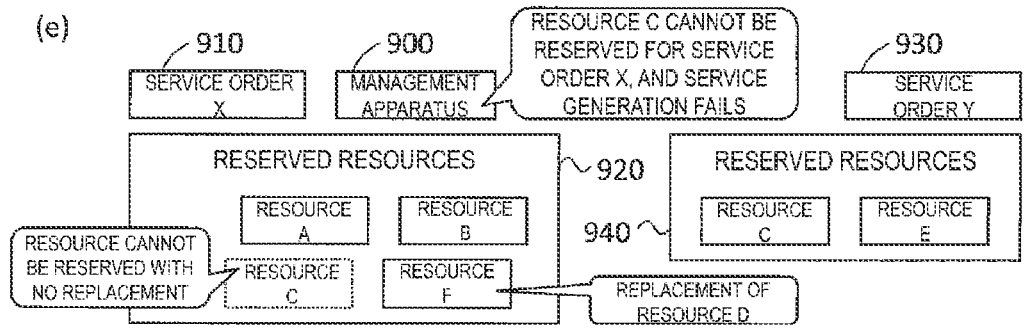

FIG. 1 is a diagram for describing problems of network service generation processing in an existing management apparatus 900 as a comparative example. The management apparatus 900 is, for example, the management apparatus disclosed in Patent Literature 1, and is a management apparatus that receives a service order (service request) of a network service from a user (service requester), reserves resources required for the received network service provision, and uses the reserved resources to generate a service. The network service has service requirements (service specifications) such as performance (processing capability) and capacity, and the management apparatus 900 reserves resources satisfying resource requirements required to satisfy the service requirements. When the reservation of the resources or the generation of the service fails, the management apparatus 900 cancels the reservation, and notifies the user of a service generation failure.

The resources are resources that are used for providing the service of virtualized server apparatus or a network apparatus. For example, examples of the resources include a virtual machine including a virtual central processing unit (CPU) or a virtual memory, a virtual network (network slice), a virtual storage, and the like. The resource requirements of the resources that are to be allocated to the network service, for example, performance (the number of CPU cores) of a virtual CPU, storage capacity, and network band are defined from the service requirements included in the service order. Virtual resources may not always be provided from one apparatus or one site, and may be provided from a plurality of apparatuses or a plurality of sites.

When a service order X 910 of the network service is received from the service requester, the management apparatus 900 reserves, as reserved resources 920, a resource A, a resource B, a resource C, and a resource D required for individual virtual network functions constituting the network service. Subsequently, the management apparatus 900 secures the reserved resources 920, uses the secured reserved resources 920 to generate the individual virtual network functions, and generates the network service (service) by connecting the virtual network functions (see FIG. 1(a)). Subsequently, the management apparatus 900 provides the generated network service to the service requester of the service order X 910.

In the present specification, the reservation of the resources means that resources on a network functions virtualization infrastructure (infrastructure that provides resources required to execute the network service) are reserved for use over a period of time before the use. The securing of the resources means that resources on the network functions virtualization infrastructure, at the start of use, are secured as resources to be provided to the virtual network function.

Here, when a failure occurs in the resource D reserved before the service generation, the resource D cannot be secured, and the management apparatus 900 fails to generate the network service (see FIG. 1(b)). In this case, the management apparatus 900 releases all the reserved resources (see FIG. 1(c)), and notifies the service requester of the service generation failure. Thereafter, when the service order is received again from the service requester, the management apparatus 900 attempts to re-reserve all the resources required to generate the network service.

However, when the resource requirements required for the virtual network function such as a large number of CPU cores and a wide network band are strict, and rare resources are once released in the network functions virtualization infrastructure, the management apparatus 900 may fail to re-reserve identical resources. For example, it is assumed that the management apparatus 900 reserves the rare resource C as reserved resources 940 of another service order Y 930 before re-reserving the rare resource C as the reserved resources 920 of the service order X 910 (see FIG. 1(d)). The management apparatus 900 can reserve a resource F replacing the resource D that is not rare, but cannot reserve a resource replacing the resource C. Thus, the management apparatus 900 fails to generate the service (see FIG. 1(e)). The resource replacing the resource D means that this resource satisfies the resource requirements of the virtual network function using the resource D.

A cause of the service generation failure is not limited to a failure of the reserved resource. There are a case where the resources are used before the service order is received, and there is no free resource available to reserve the resources and a case where a resource that is not present is erroneously registered due to defectiveness in management of the network functions virtualization infrastructure, this resource can be apparently reserved but is not present in reality, and the resource cannot be secured.

Network Service Generation in Present Invention

Figure 2:
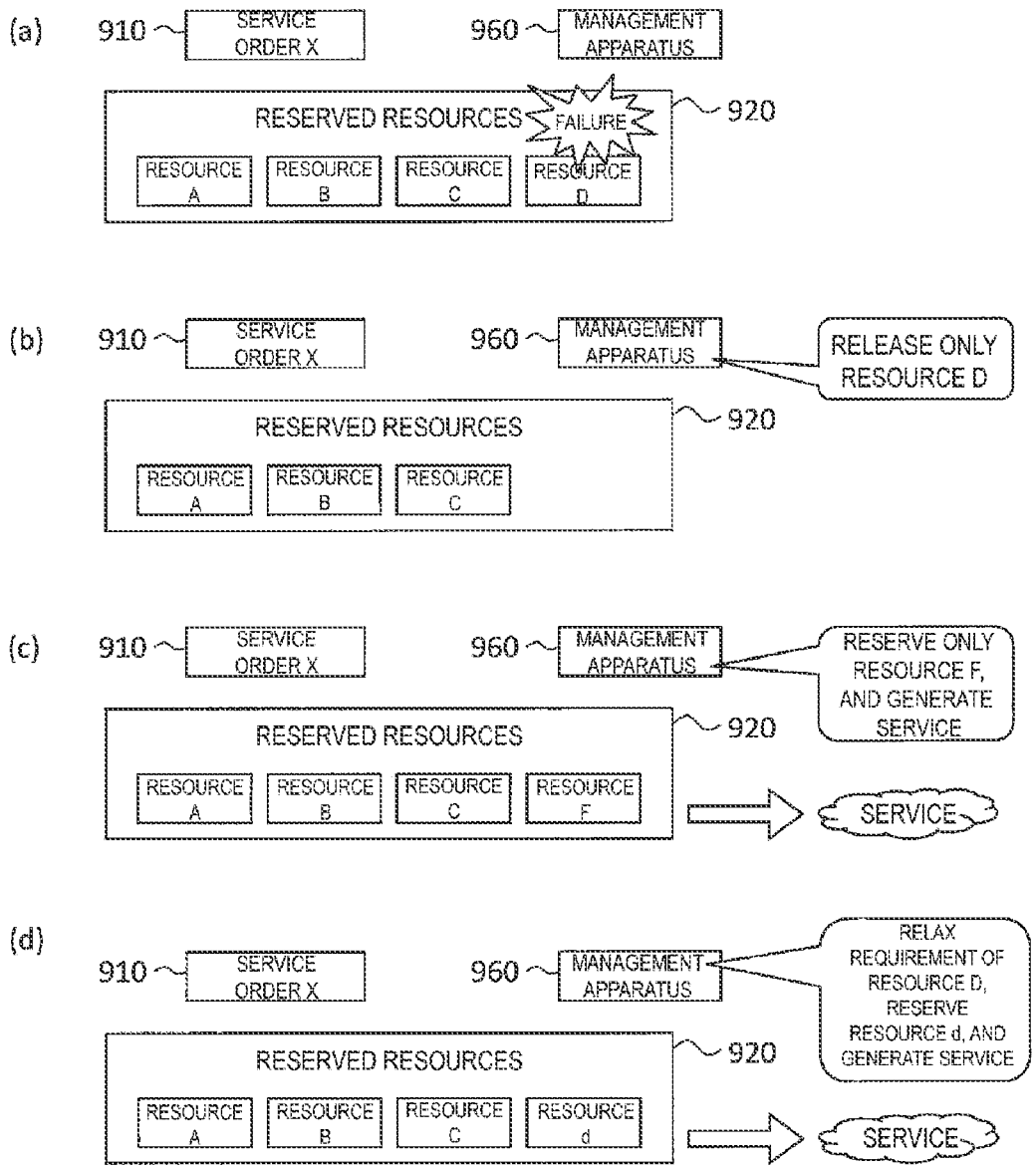
FIG. 2 is a diagram for describing an overview of network service generation processing according to the present embodiment.

FIG. 2 is a diagram for describing an overview of network service generation processing according to the present embodiment. When a failure occurs in the reserved resource D (see FIG. 2(a)), a management apparatus 960 according to the present invention releases only the resource D in which the failure occurs without releasing all the reserved resources 920, and maintains the resource A, the resource B, and the resource C in a reserved state as the reserved resources 920 (see FIG. 2(b)).

Subsequently, the management apparatus 960 additionally reserves the resource F replacing the failed resource D, adds the resource F to the reserved resources 920, uses the resource A, the resource B, the resource C, and the resource F to generate the service (see FIG. 2(c)), and provides the service to a transmission source (service requester) of the service order X 910.

When the failure occurs in the reserved resource, the management apparatus 960 releases only the failed resource while maintaining the normal resources in the reserved state without releasing the normal resources, and reserves another resource instead of the failed resource. Thus, the management apparatus 960 can provide the service without failing to re-reserve the normal resources after the normal reserved resources are once released, and consequently can shorten a lead time.

When a resource replacing the resource D is not found on a network functions virtualization infrastructure 140, the management apparatus 960 according to the present invention relaxes the resource requirements to reserve a resource d, uses the resource A, the resource B, the resource C, and the resource d to generate the service, and provides the service (see FIG. 2(d)). This relaxed resource requirements are resource requirements of the virtual network function using the resource D. Examples of the relaxed resource requirements include performance of the CPU, a memory size, a size of a storage, and a band of a network, and the like, for a server that provides the service. The management apparatus 960 relaxes the resource requirements by reducing the performance or reducing the size (capacity).

Even when there is no free resource on the network functions virtualization infrastructure 140 satisfying such requirements and the resource cannot be reserved, the service is generated and provided by relaxing the resource requirements, and thus, the management apparatus 96W can shorten a lead time for providing a service. At the beginning of starting to use the service, users who need not fully satisfy the service requirements can quickly use the service.

Overall Configuration of Network Service Management Apparatus

Figure 3:
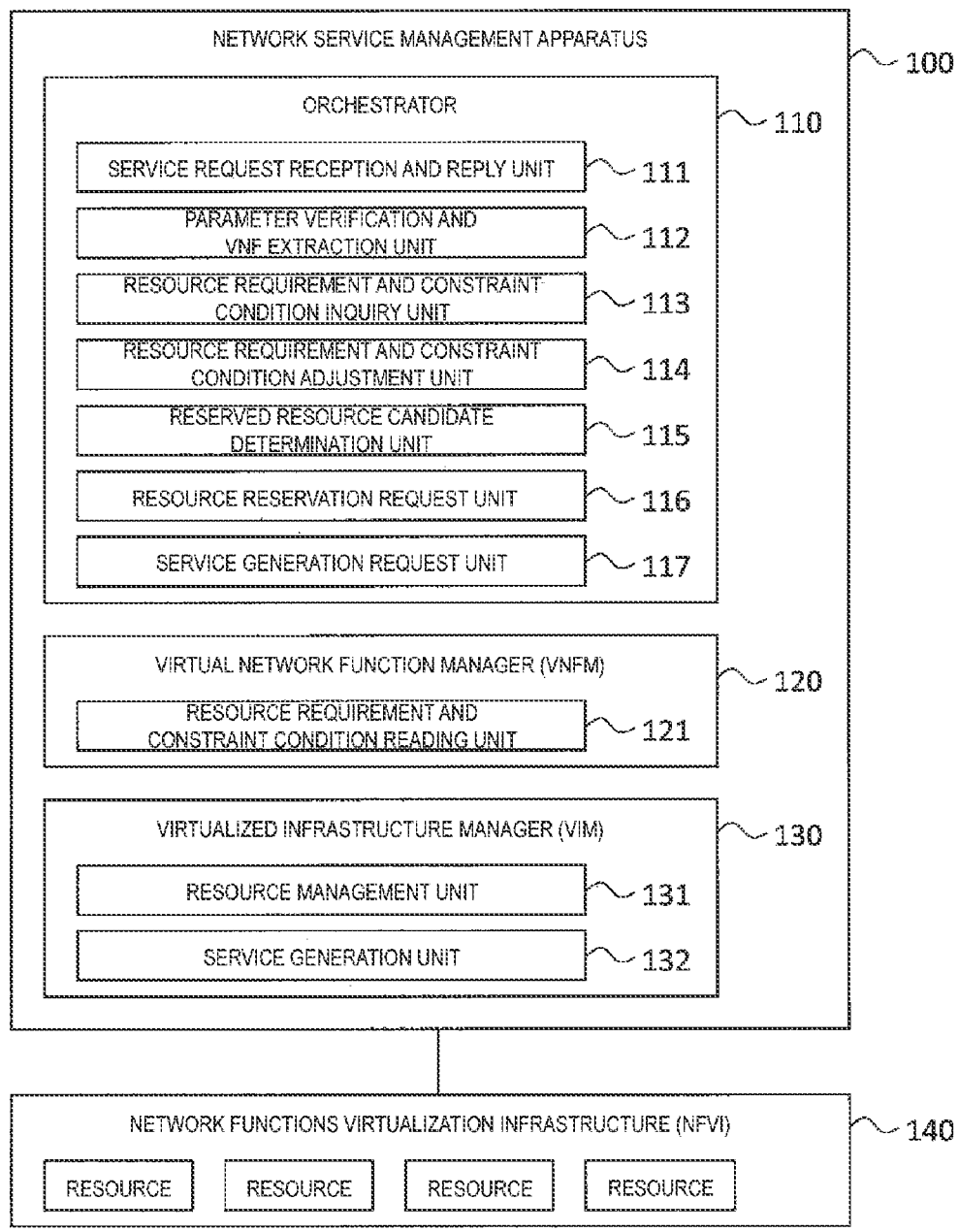
FIG. 3 is a diagram illustrating an overall configuration of a network service management apparatus according to the present embodiment.

FIG. 3 is a diagram illustrating an overall configuration of a network service management apparatus 100 according to the present embodiment. The network service management apparatus 100 is configured to manage lifecycles of virtual network functions operating on physical or virtual resources present on a network functions virtualization infrastructure (NFVI) 140 connected via a network and network services (hereinafter, simply referred to as services) in which one or more virtual network functions are combined.

The network functions virtualization infrastructure 140 is an infrastructure that includes physical resources and virtual resources in which physical resources are virtualized, and provides resources necessary for execution of virtual network functions. The network service management apparatus 100 receives a service order (service request) requesting the network service. The network service management apparatus 100 defines and reserves resources used by the virtual network functions constituting the network service from among resources included in the network functions virtualization infrastructure 140. The network service management apparatus 100 uses the reserved resources to generate the virtual network function. The network service management apparatus 100 connects the generated virtual network functions to generate the service, and provides the service to the service requester.

The network service management apparatus 100 includes an orchestrator 110, a virtual network function manager (VNFM) 120, and a virtualized infrastructure manager (VIM) 130. The orchestrator 110 manages lifecycles such as generation, monitoring, and deletion of the network service constituted by one or more virtual network functions (network applications).

The virtual network function manager 120 manages the lifecycles of individual virtual network functions, and provides resource requirements and constraint information required for the virtual network functions to the orchestrator 110.

The virtualized infrastructure manager 130 manages operations of physical and virtual resources such as a CPU, a memory, a storage, and a network, and instructs reservation of resources on the network functions virtualization infrastructure 140 and generation of the network service constituted by the virtual network functions. Hereinafter, the virtual network function may also be referred to as the network service, or may be simply referred to as the service.

The orchestrator 110 includes a service request reception and reply unit 111, a parameter verification and virtual network function extraction unit (in FIG. 3, described as a parameter verification and VNF extraction unit) 112, a resource requirement and constraint condition inquiry unit 113, a resource requirement and constraint condition adjustment unit 114, a reserved resource candidate determination unit 115, a resource reservation request unit 116, and a service generation request unit 117.

Figure 5:
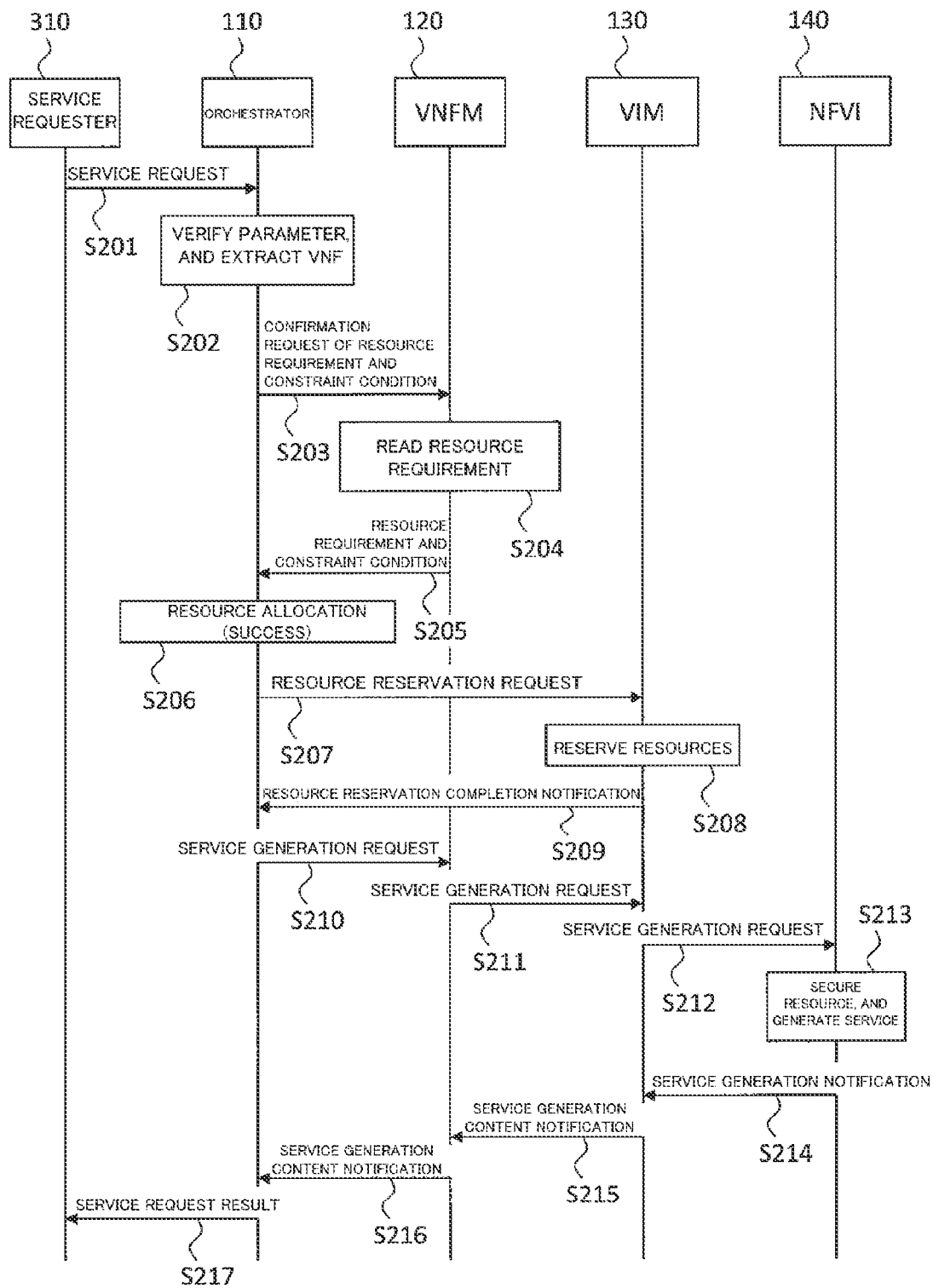
FIG. 5 is a sequence diagram of the network service generation processing when reservation and securing of resources succeed according to the present embodiment.

The service request reception and reply unit 111 receives a service request from service requester ((service) user, not illustrated in FIG. 3, and see a service requester 310 in FIG. 5), and replies a generation result of the network service and a service configuration content included in the service request.

The parameter verification and virtual network function extraction unit 112 verifies parameters included in the service request, and extracts the virtual network functions constituting the network service.

The resource requirement and constraint condition inquiry unit 113 inquires the virtual network function manager 120 about resource requirements and constraint conditions of the virtual network functions constituting the service. The resource requirements include CPU performance (the number of CPU cores), storage capacity, a band of a network, and the like. The constraint conditions include conditions related to a location at which the virtual network functions operate (a site at which the network functions virtualization infrastructure 140 is present) and the like. Hereinafter, the resource requirements and the constraint conditions may be simply referred to as the resource requirements.

When there is no available resource satisfying the resource requirements of the virtual network functions constituting the network service requested by the service request on the network functions virtualization infrastructure 140, the resource requirement and constraint condition adjustment unit 114 relaxes and adjusts the resource requirements based on an adjustment policy.

The reserved resource candidate determination unit 115 determines (also described as defines or allocates) candidates of the resource to be used by the virtual network function from an available resource group on the network functions virtualization infrastructure 140 based on the resource requirements of the virtual network functions constituting the network service included in the service request.

The resource reservation request unit 116 requests the virtualized infrastructure manager 130 to reserve the resource candidates allocated to the virtual network function by the reserved resource candidate determination unit 115.

The service generation request unit 117 requests the virtualized infrastructure manager 130 to perform the following request. The request is to secure the reserved resources allocated to the virtual network functions on the network functions virtualization infrastructure 140, generate the virtual network functions, and connect a plurality of virtual network functions to generate the network service.

The virtual network function manager 120 includes a resource requirement and constraint condition reading unit 121. The resource requirement and constraint condition reading unit 121 receives the query from the resource requirement and constraint condition inquiry unit 113, reads the resource requirements and the constraint conditions of the virtual network functions to be generated from a network service catalog (not illustrated), and replies the read resource requirements and constraint conditions.

The virtualized infrastructure manager 130 includes a resource management unit 131 and a service generation unit 132. The resource management unit 131 reserves the resources allocated to the virtual network functions on the network functions virtualization infrastructure 140 according to the request of the resource reservation request unit 116, and replies a reservation result. According to the request of the service generation request unit 117, the service generation unit 132 secures the reserved resources allocated to the virtual network functions on the network functions virtualization infrastructure 140, activates (generates) the virtual network functions on the resources, and connects a plurality of virtual network functions to generate the network service, and replies the generation result.

The orchestrator 110, the virtual network function manager 120, and the virtualized infrastructure manager 130 may each operate on a physical server having a CPU, a storage unit, and a communication unit, may operate on one or a plurality of physical servers, or may operate on one or more virtual machines.

Network Service Generation Processing

Figure 4:
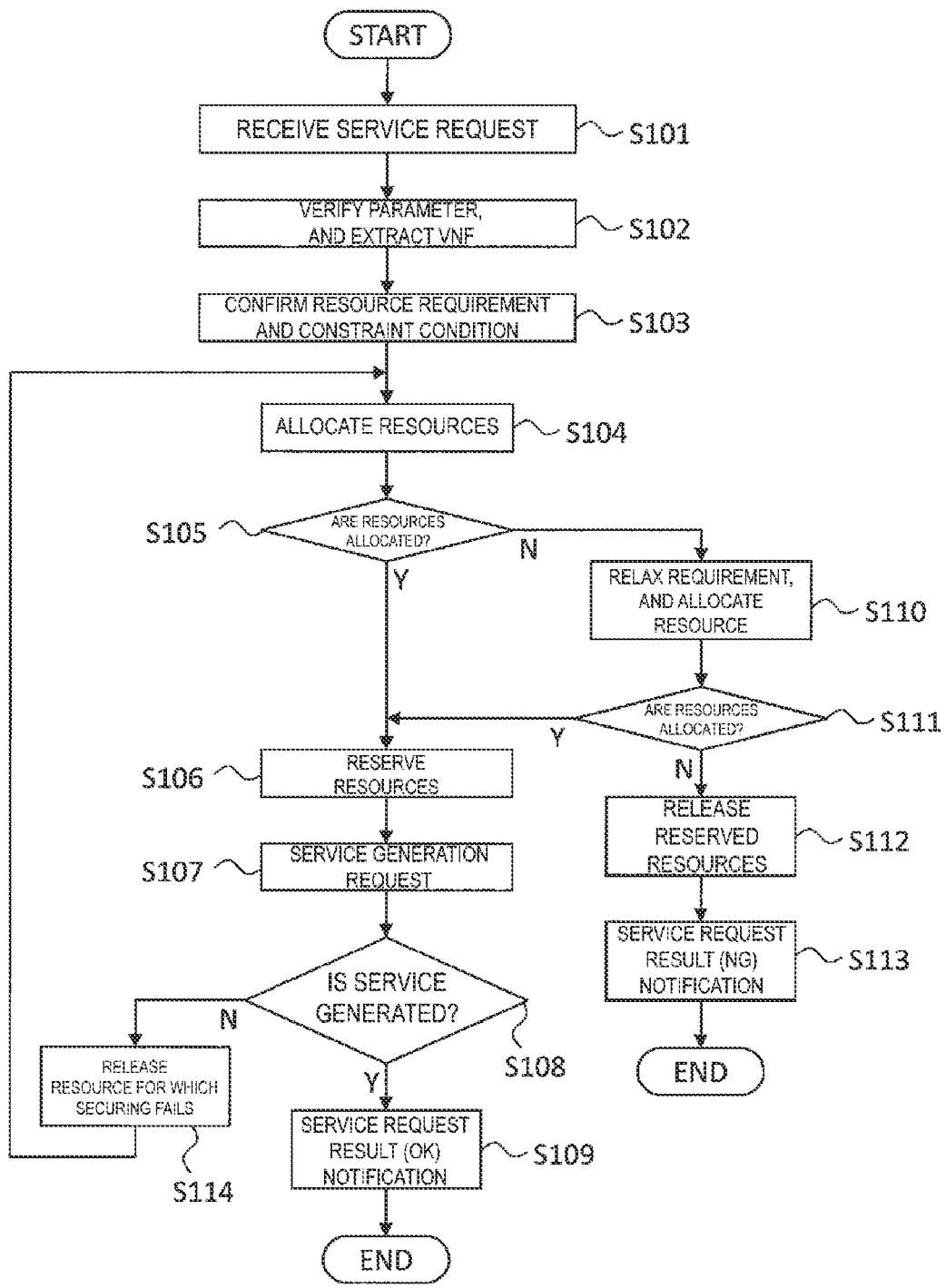
FIG. 4 is a flowchart of the network service generation processing according to the present embodiment.

Hereinafter, network service generation processing will be described with reference to a flowchart and a sequence diagram. FIG. 4 is a flowchart illustrating the network service generation processing according to the present embodiment. The network service generation processing mainly executed by the orchestrator 110 will be described with reference to FIG. 4. In step S101, the service request reception and reply unit 111 receives the service request transmitted by the service requester (see the service requester 310 of FIG. 5).

In step S102, the parameter verification and virtual network function extraction unit 112 verifies the parameters included in the service request, and extracts one or a plurality of virtual network functions (described as VNF in FIG. 4) constituting the network service.

In step S103, the resource requirement and constraint condition inquiry unit 113 inquires the virtual network function manager 120 about the resource requirements of the virtual network functions extracted in step S102, and confirms the extracted resource requirements. The resource requirement and constraint condition reading unit 121 of the virtual network function manager 120 reads, from the network service catalog, the resource requirements of the virtual network functions included in the inquiry, and replies the read resource requirements.

In step S104, the reserved resource candidate determination unit 115 defines the resource candidates allocated to the virtual network functions from among the available resources satisfying the resource requirements confirmed in step S103 on the network functions virtualization infrastructure 140. When there is the plurality of virtual network functions, the resource candidates to be allocated are defined for each virtual network function.

The reserved resource candidate determination unit 115 may acquire the available resources (free resources) on the network functions virtualization infrastructure 140 from the reserved resource candidate determination unit 115 itself (the storage of the orchestrator 110), or may inquire the virtual network function manager 120 or the virtualized infrastructure manager 130 about the available resources and may acquire the available resources.

Alternatively, the reply from the resource requirement and constraint condition reading unit 121 in step S103 may include information on the available resources satisfying the resource requirements of the virtual network functions. By doing this, the reserved resource candidate determination unit 115 can define the resource candidates to be allocated to the virtual network functions while referring the information on the resources acquired from the resource requirement and constraint condition reading unit 121.

In step S105, the reserved resource candidate determination unit 115 proceeds to step S106 when the allocation of the resource candidates of all the virtual network functions defined in step S104 succeeds (step S105→Y), and proceeds to step S110 when the allocation of the resource candidates fails (step S105→N). The reason why the reserved resource candidate determination unit 115 fails to allocate the resources satisfying the resource requirements is, for example, that all the resources satisfying the resource requirements of the virtual network functions are already reserved and are being used by another service (virtual network functions constituting another service).

In step S106, the resource reservation request unit 116 requests the virtualized infrastructure manager 130 to reserve the resource candidates.

In step S107, the service generation request unit 117 requests the virtualized infrastructure manager 130 via the virtual network function manager 120 to use the reserved resources to generate the virtual network functions and further connect the plurality of virtual network functions to generate the network service.

In response to this request, the virtualized infrastructure manager 130 secures the reserved resources on the network functions virtualization infrastructure 140, and uses the resources to generate (activate) the virtual network functions. The virtualized infrastructure manager 130 connects the plurality of virtual network functions to generates the network service. The virtualized infrastructure manager 130 notifies the service generation request unit 117 via the virtual network function manager 120 of whether the securing of the resources and the generation of the network service (virtual network functions) succeed.

In step S108, the service generation request unit 117 proceeds to step S109 when the securing of the resources for all the virtual network functions succeeds and the generation of the network service succeeds (step S108→Y), and proceeds to step S114 when the securing of the resources and the generation of the network service fail (step S108→N).

In step S109, the service request reception and reply unit 111 notifies the service requester of a result indicating that the generation of the network service included in the service request succeeds. The service request reception and reply unit 111 may additionally notify the service requester of the service content including the information on the resources (the resources used by the virtual network functions constituting the service).

In step S110, the resource requirement and constraint condition adjustment unit 114 changes to relax the resource requirements based on the adjustment policy for the virtual network functions to which the allocation of the resource candidates fail. The reserved resource candidate determination unit 115 allocates, to the virtual network functions, the resource candidates satisfying the resource requirements changed and relaxed. As the content of the relaxation of the resource requirements, for example, the performance of the CPU is reduced (the number of CPU cores is reduced), the storage capacity is reduced, the number of virtual network functions is reduced when there is a plurality of virtual network functions of an identical type in a load balancing cluster system, and the site at which the network functions virtualization infrastructure 140 that provides the resources is present is changed. The resource requirement and constraint condition adjustment unit 114 and the reserved resource candidate determination unit 115 find available resources while gradually relaxing the resource requirements, and allocate the resource candidates to the virtual network functions.

When there is a plurality of virtual network functions to which the allocation of the resource candidates fails, the resource requirement and constraint condition adjustment unit 114 changes to relax the resource requirements of each of the virtual network functions. The reserved resource candidate determination unit 115 allocates, to the corresponding virtual network functions, the resource candidates satisfying the resource requirements changed and relaxed.

In step S11, the reserved resource candidate determination unit 115 proceeds to step S106 when the allocation of the resource candidates succeeds for all the virtual network functions with the resource requirements relaxed in step S110 (step S111→Y), and proceeds to step S112 when the allocation of the resource candidates fails (step S111→N).

In step S112, the resource reservation request unit 116 requests the virtualized infrastructure manager 130 to release all the reserved resource candidates.

In step S113, the service request reception and reply unit 111 notifies the service requester of a result indicating that the generation of the network service included in the service request fails.

In step S114, the resource management unit 131 of the virtualized infrastructure manager 130 cancels the reservation of the resource for which the securing fails to release the resource, and returns to step S104. In step S104 returned from step S114, the reserved resource candidate determination unit 115 allocates, as the resource candidate, the available resource that replaces the resource released in step S114 and satisfies the resource requirements of the virtual network functions to which the resource that fails to be secured is allocated. The resource management unit 131 maintains the resources for which the securing succeeds in the reserved state without releasing these resources, and the reserved resource candidate determination unit 115 maintains these resources in a state of being allocated to the virtual network functions.

In step S107 returned from step S114, the service generation request unit 117 requests the virtualized infrastructure manager 130 via the virtual network function manager 120 to use each of the reserved resources for which the reservation is not canceled to generate the virtual network functions and further connect the plurality of virtual network functions to generate the network service.

Network Service Generation Processing: Normal Case

Hereinafter, the network service generation processing will be described as four cases to be described below. A first case is a case (normal case) where the reservation and securing of the resources succeed. A second case is a case where the resources are reserved but the securing of the resource fails due to a failure, the resource is re-reserved, and the securing of the resource succeeds. A third case is a case where the resource requirements are relaxed and the reservation and securing of the resources succeed. A fourth case is a case where the allocation fails even though the resource requirements are relaxed.

FIG. 5 is a sequence diagram of the network service generation processing when the reservation and securing of the resources succeed according to the present embodiment. The network service generation processing when the allocation of the resource candidates succeeds in step S104 of FIG. 4 (step S105→Y) and the generation of the service succeeds (step S108→Y) will be described with reference to FIG. 5. The network service generation processing is started when the service requester 310 transmits the service request to the network service management apparatus 100 to request the network service.

In step S201, the service request reception and reply unit 111 of the orchestrator 110 receives the service request transmitted by the service requester (see step S101 of FIG. 4). In step S202, the parameter verification and virtual network function extraction unit 112 of the orchestrator 110 verifies the parameters included in the service request, and extracts the virtual network functions constituting the network service (see step S102).

In step S203, the resource requirement and constraint condition inquiry unit 113 of the orchestrator 110 transmits, to the virtual network function manager 120, a request to confirm the resource requirements of the virtual network functions extracted in step S202.

In step S204, the resource requirement and constraint condition reading unit 121 of the virtual network function manager 120 reads, from the network service catalog (not illustrated), the resource requirements of the virtual network functions included in the confirmation request in step S203.

In step S205, the resource requirement and constraint condition reading unit 121 transmits the resource requirements of the virtual network functions read in step S204 to the orchestrator 110. The transmission may include the information on the available resources satisfying the resource requirements on the network functions virtualization infrastructure 140 together with the resource requirements. Steps S203 to S205 above correspond to step S103 of FIG. 4.

In step S206, the reserved resource candidate determination unit 115 of the orchestrator 110 allocates, as the resource candidates of the virtual network functions, the available resources on the network functions virtualization infrastructure 140 that satisfy the resource requirements acquired in step S205 (see steps S104 and S105→Y). The reserved resource candidate determination unit 115 may acquire the information on the available resources from the reserved resource candidate determination unit 115 itself (the storage of the orchestrator 110), may inquire the virtual network function manager 120 or the virtualized infrastructure manager 130 to acquire the information on the available resources, or may refer to the information on the available resources if it is acquired in step S205.

In step S207, the resource reservation request unit 116 of the orchestrator 110 transmits, to the virtualized infrastructure manager 130, a request to reserve the resource candidates allocated to the virtual network functions constituting the network service.

In step S208, the resource management unit 131 of the virtualized infrastructure manager 130 reserves the resources included in the reservation in step S207.

In step S209, the resource management unit 131 notifies that the reservation of the resources is completed. Steps S207 to S209 above correspond to step S106 of FIG. 4.

In step S210, the service generation request unit 117 of the orchestrator 110 transmits a request to generate the virtual network functions and the service to the virtual network function manager 120.

In step S211, the virtual network function manager 120 transmits the generation request of step S210 to the virtualized infrastructure manager 130.

In step S212, the service generation unit 132 of the virtualized infrastructure manager 130 requests the network functions virtualization infrastructure 140 to secure the resources reserved in step S208, generate the virtual network functions, and further connect the plurality of virtual network functions to generate the network service.

In step S213, the network functions virtualization infrastructure 140 secures the reserved resources requested in step S212, and uses the resources to generate (activate) the virtual network functions. The network service is generated by connecting the plurality of virtual network functions.

In step S214, the network functions virtualization infrastructure 140 notifies that the service is generated.

In step S215, the service generation unit 132 of the virtualized infrastructure manager 130 notifies of the content of the generated service. The content of the service includes the contents of the generated virtual network functions and resources of the generated virtual network functions (such as the performance of the virtual CPU).

In step S216, the virtual network function manager 120 notifies of the generated service content. Steps S210 to S216 correspond to steps S107 and S108→Y of FIG. 4.

In step S217, the service request reception and reply unit 111 of the orchestrator 110 notifies the service requester of the result indicating that the generation of the network service succeeds. The notification may include the contents of the generated virtual network functions or resources of the generated virtual network functions (see step S109).

Figure 6:
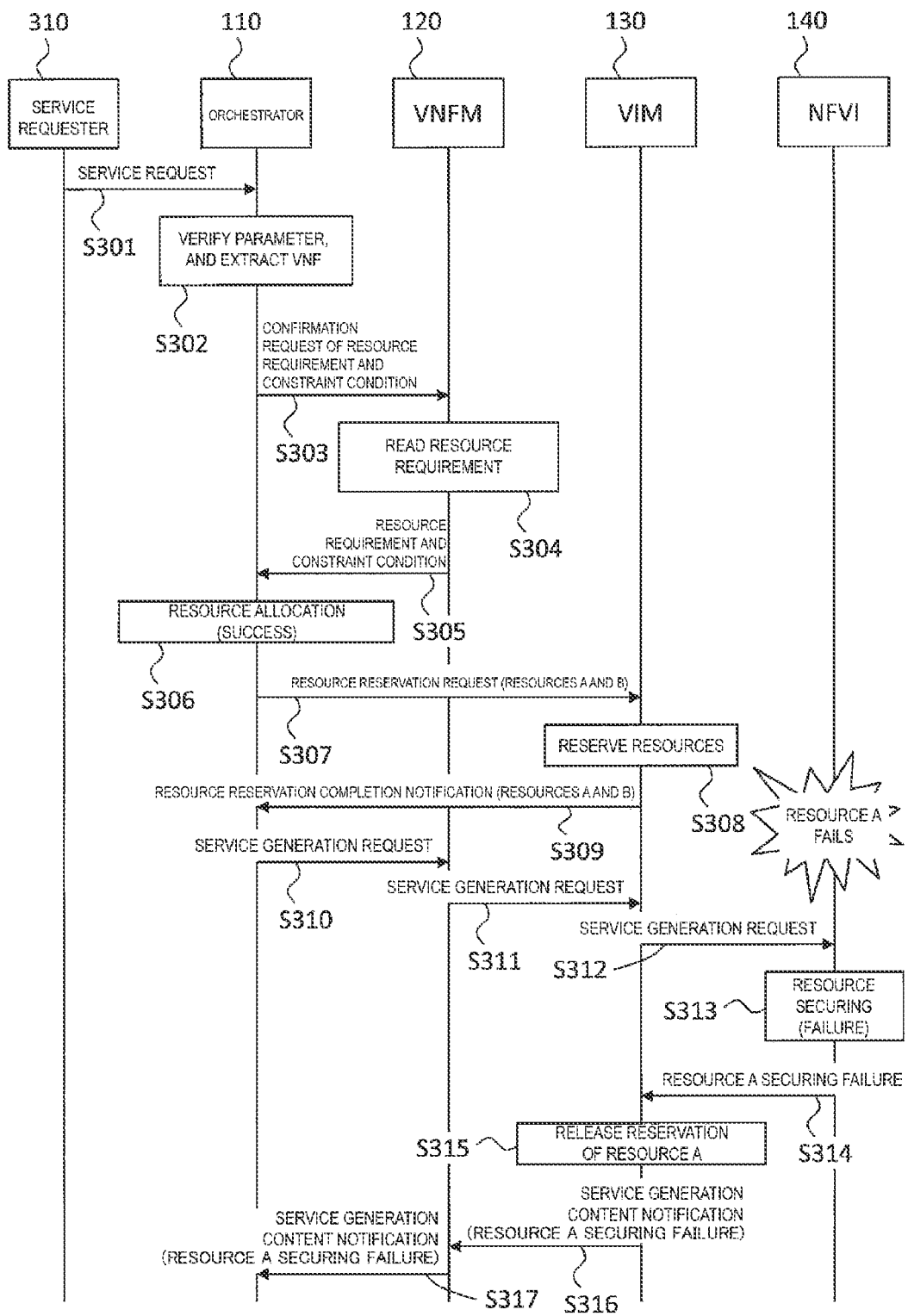
FIG. 6 is a sequence diagram (1) of the network service generation processing when the reserved resource fails, the resource is re-reserved, and the securing of the resource succeeds according to the present embodiment.
Figure 7:
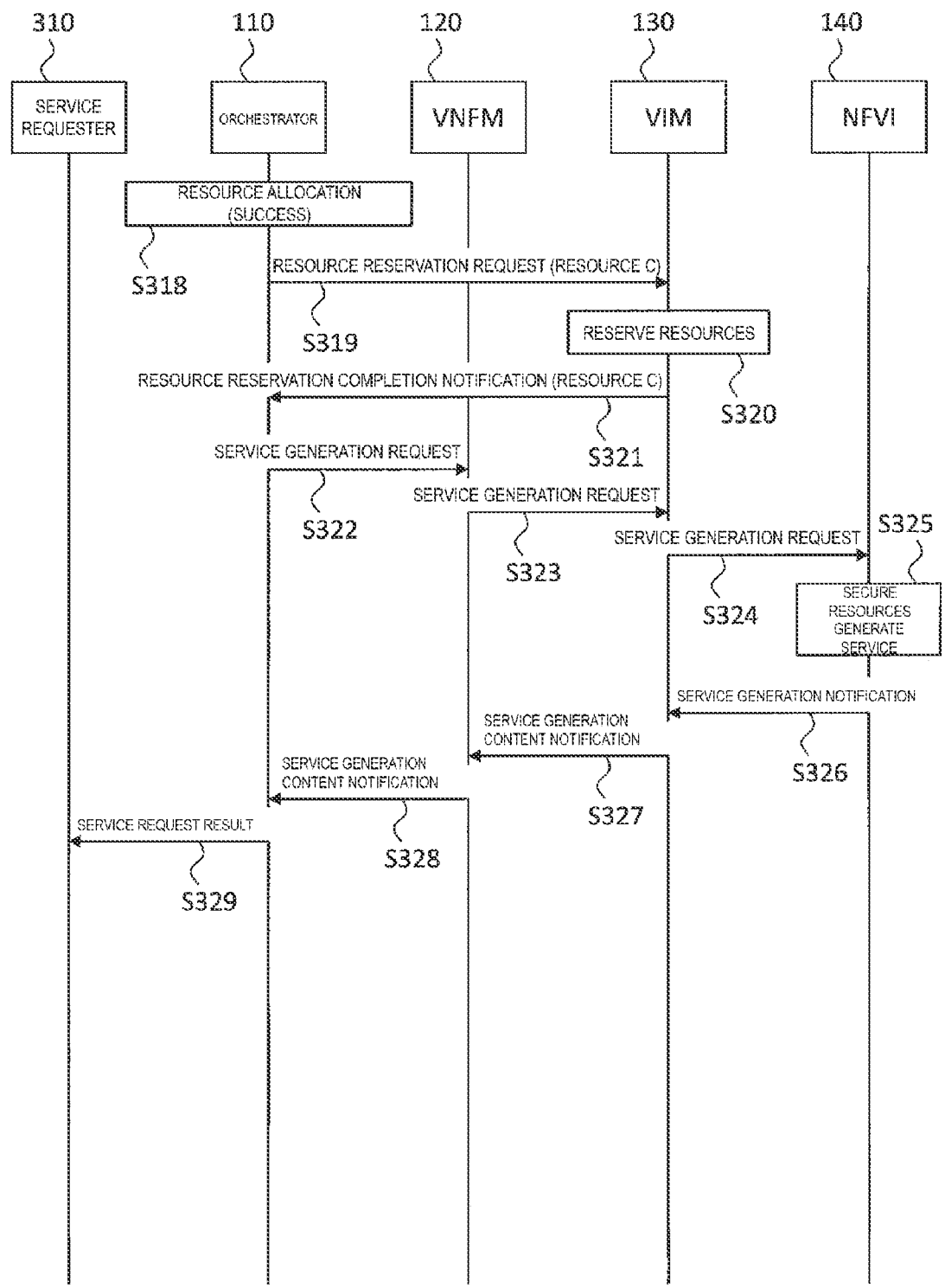
FIG. 7 is a sequence diagram (2) of the network service generation processing when the reserved resource fails, the resource is re-reserved, and the securing of the resource succeeds according to the present embodiment.

Network Service Generation Processing. Case Where Reserved Resource Fails, Resource is Re-reserved, and Securing of Resource Succeeds Next, a case where the network service management apparatus 100 succeeds to allocate the resources to the virtual network functions and reserves the resources, but because the resource allocated to and reserved for any virtual network function constituting the network service fails, the network service management apparatus 100 allocates, reserves, and succeeds to secure another resource will be described. FIG. 6 is a sequence diagram (1) of the network service generation processing when the reserved resource fails, the resource is re-reserved, and the securing of the re-reserved resource succeeds according to the present embodiment. FIG. 7 is a sequence diagram (2) of the network service generation processing when the reserved resource fails, the resource is re-reserved, and the securing of the re-reserved resource succeeds according to the present embodiment. The network service generation processing when the allocation of the resource candidates succeeds in step S104 of FIG. 4 (step S105→Y), the reserved resource fails, and the generation of the service fails (step S108→N), re-allocation of the resource succeeds (step S105→Y), and the generation of the service succeeds (step S108→Y) will be described with reference to FIGS. 6 and 7.

Steps S301 to S309 are similar to steps S201 to S209, respectively. In steps S307 to S309, it is assumed that the resource A and the resource B are reserved.

Here, it is assumed that a failure occurs in the reserved resource A.

Steps S310 to S312 are similar to steps S210 to S212, respectively.

In step S313, the network functions virtualization infrastructure 140 attempts to secure the reserved resource A and resource B requested in step S312, but fails to secure the resource A due to a failure.

In step S314, the network functions virtualization infrastructure 140 notifies the virtualized infrastructure manager 130 that the securing of the resource A fails.

In step S315, the service generation unit 132 of the virtualized infrastructure manager 130 instructs the resource management unit 131 to cancel the reservation of the resource A to release the resource A.

In step S316, the service generation unit 132 of the virtualized infrastructure manager 130 notifies the service generation content. Here, the service generation unit 132 notifies that the resource A is failed to be secured and the generation of the service fails.

In step S317, the virtual network function manager 120 notifies the service generation content (the failure to secure the resource A). Steps S310 to S317 above correspond to steps S107, S108→N. and S114 of FIG. 4.

Moving on to FIG. 7, in step S318, the reserved resource candidate determination unit 115 of the orchestrator 110 allocates, as the resource candidate, the available resource satisfying the resource requirements of the virtual network function to which the released resource A is allocated (see description of S104 in the description of step S114). Hereinafter, the description is made on the assumption that the resource C replacing the resource A is allocated as the resource candidate.

Steps S319 to S321 are similar to steps S307 to S309, respectively. However, the resource to be reserved is the resource C rather than the resource A and the resource B. The resource B is reserved in steps S307 to S309, and is continuously maintained in the reserved state.

Steps S322 to S329 are similar to steps S210 to S217 of FIG. 5, respectively. The resources reserved in step S325 and used in the virtual network functions are the resource B and the resource C.

Figure 8:
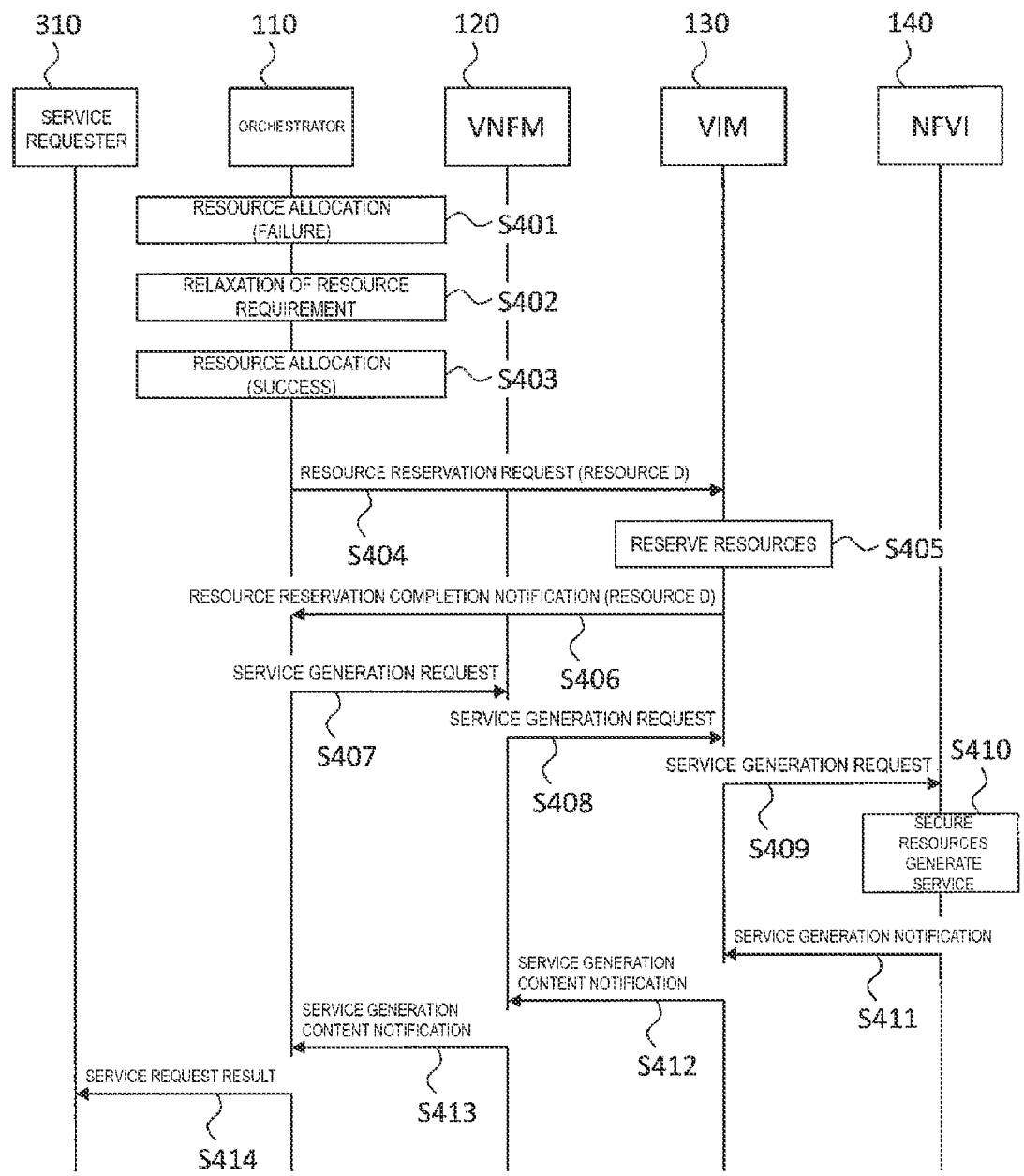
FIG. 8 is a sequence diagram of the network service generation processing when there is no resource satisfying resource requirements according to the present embodiment.

Network Service Generation Processing: Case Where Failure Occurs in Reserved Resource and There is No Resource Satisfying Equivalent Resource Requirements Next, a case where there is no resource satisfying the resource requirements for any virtual network function constituting the network service will be described. FIG. 8 is a sequence diagram of the network service generation processing when there is no resource satisfying the resource requirement according to the present embodiment. The network service generation processing when the reserved resource fails and the generation of the service fails (step S108→N of FIG. 4), the allocation of a resource fails with the resource requirements equivalent to the failed resource (step S105→N), and the securing of the resource satisfying the relaxed requirements succeeds (step S111→Y) will be described with reference to FIG. 8. In a stage before step S401 of FIG. 8, it is assumed that the reserved resource A fails, and the generation of the service fails (see steps S301 to S317 of FIG. 6).

In step S401, the reserved resource candidate determination unit 115 of the orchestrator 110 attempts to allocate, as the resource candidate, the available resource satisfying the resource requirements of the virtual network function to which the released resource A is allocated, but cannot find the resource candidate and fails to allocate the resource (see step S105→N of FIG. 4).

In step S402, the resource requirement and constraint condition adjustment unit 114 relaxes the resource requirements of the virtual network function to which the released resource A is allocated based on the adjustment policy.

In step S403, the reserved resource candidate determination unit 115 allocates, as the resource candidate of the virtual network function to which the released resource A is allocated, the available resource satisfying the relaxed resource requirements. Steps S402 to S403 correspond to step S110 of FIG. 4.

In FIG. 8, the allocation of the resource succeeds (step S403) by relaxing the resource requirements once (step S402). When the resource is not found in one relaxation of the resource requirements, the relaxation of the resource requirements and the allocation of the available resource are repeated. Here, the description is continued on the assumption that the resource requirements are relaxed in step S402 and the resource D is allocated as the resource candidate in step S403.

Steps S404 to S414 are similar to steps S207 to S217, respectively. However, the resource to be reserved in steps S404 to S406 is the resource D. The resource B is continuously maintained in the reserved state. The resources that are secured in step S410 and used in the virtual network function are the resource B and the resource D.

In the above description of FIG. 8, the network service management apparatus 100 fails to allocate the resource to be replaced when the resource fails after the reservation of the resource satisfying the resource requirements succeeds. At a point of time at which the service request is received, the network service management apparatus 100 similarly performs the processing even when the allocation of the resource satisfying the resource requirements of any virtual network function constituting the service fails. For example, in the allocation of the resource of step S306 of FIG. 6, it is assumed that the network service management apparatus 100 succeeds to allocate the resource B, but fails to allocate the resource A and the resource replacing the resource A. The network service management apparatus 100 relaxes the resource requirements (step S402), allocates the resource D (see step S403), reserves the resource B and the resource D (see steps S404 to S406), and generates the service (see steps S407 to S413).

Figure 9:
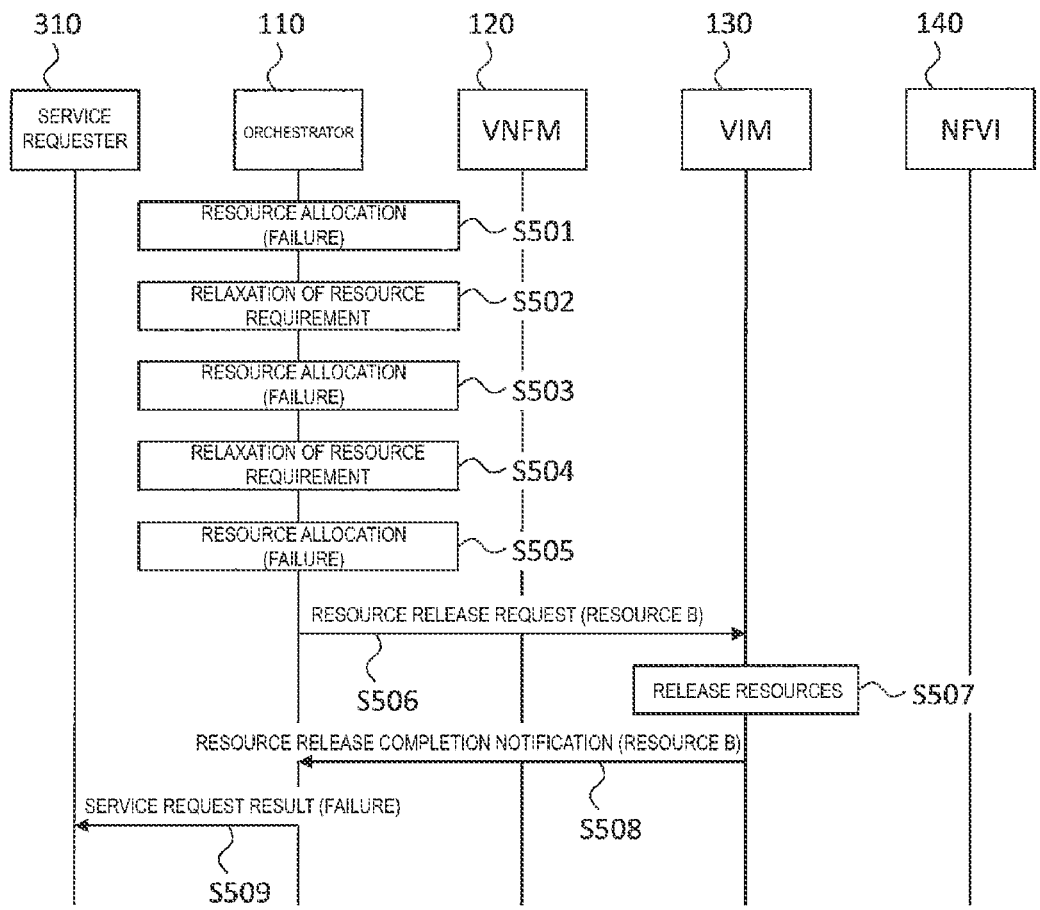
FIG. 9 is a sequence diagram of the network service generation processing when there is no resource satisfying the resource requirements even though the resource requirements are relaxed according to the present embodiment.

Network Service Generation processing: Case Where Reserved Resource Fails and There is No Resource Even Though Resource Requirements are Relaxed Finally, a case where the resource cannot be allocated to any virtual network function constituting the network service even though the resource requirements are relaxed will be described. FIG. 9 is a sequence diagram of the network service generation processing when there is no resource satisfying the resource requirements even though the resource requirements are relaxed according to the present embodiment. The network service generation processing when the reserved resource fails and the generation of the service fails (step S108→N of FIG. 4), the allocation of a resource that has the resource requirements equivalent to the failed resource fails (step S105→N), and the allocation of the resource satisfying the relaxed requirements fails (step S111→N) will be described with reference to FIG. 9. In a stage before step S501 of FIG. 9, it is assumed that the reserved resource A fails, and the generation of the service fails (see steps S301 to S317 of FIG. 6).

In step S501, the reserved resource candidate determination unit 115 of the orchestrator 110 attempts to allocate, as the resource candidate, the available resource satisfying the resource requirements of the virtual network function to which the released resource A is allocated, but cannot find the resource candidate and fails to allocate the resource (see step S105→N of FIG. 4).

In step S502, the resource requirement and constraint condition adjustment unit 114 relaxes the resource requirements of the virtual network function to which the released resource A is allocated based on the adjustment policy.

In step S503, the reserved resource candidate determination unit 115 attempts to allocate, as the resource candidate of the virtual network function, the available resource satisfying the relaxed resource requirements, but cannot find the resource candidate and fails to allocate the resource. In step S504, the resource requirement and constraint condition adjustment unit 114 re-relaxes the resource requirements based on the adjustment policy.

In step S505, the reserved resource candidate determination unit 115 attempts to allocate, as the resource candidate of the virtual network function, the available resource satisfying the resource requirements relaxed in step S504, and cannot find the resource candidate and fails to allocate the resource.

Hereinafter, the description is continued on the assumption that the resource requirement and constraint condition adjustment unit 114 cannot relax more than the relaxation in step S504, cannot find the available resource on the network functions virtualization infrastructure 140 even though the resource requirements are relaxed, and fails to allocate the resource. Steps S502 to S505 correspond to steps S110 and S111→N of FIG. 4.

In step S506, the resource reservation request unit 116 of the orchestrator 110 transmits a request to release the reserved resource B to the virtualized infrastructure manager 130. In step S507, the resource management unit 131 of the virtualized infrastructure manager 130 cancels the reservation of the resource B, and releases the resource B.

In step S508, the resource management unit 131 of the virtualized infrastructure manager 130 notifies that the releasing of the resource is completed. Steps S506 to S508 correspond to step S112 of FIG. 4.

In step S509, the service request reception and reply unit 111 of the orchestrator 110 notifies the service requester of the result indicating that the generation of the network service fails (see step S113 of FIG. 4).

Features of Network Service Management Apparatus

When the resource allocated to and reserved for the virtual network function constituting the service fails and cannot be secured and the generation of the service fails, the network service management apparatus 100 releases the resource for which the securing fails, allocates and reserves the resource to be replaced which satisfies the resource requirements, and generates the service. The other reserved resources are not released, and thus, the network service management apparatus 100 does not allocate the reserved resources to another service. Thus, the lead time of the service can be shortened without releasing the rare resource reserved once and failing to re-reserve this resource as in the related art.

Even though the resource satisfying the resource requirements and the constraint condition satisfying the virtual network function constituting the network service requested in the initial service request cannot be allocated, the network service management apparatus 100 can relax the resource requirements and the constraint conditions (change to relax the resource requirements according to the adjustment policy), and can provide the network service. Although the service does not satisfy the required performance or quality, the service requester (user) can use the service early.

In step S114, the resource management unit 131 of the virtualized infrastructure manager 130 cancels the reservation of a resource for which the securing fails to release the resource. Thus, the virtual network function can be newly allocated after the resource has been restored from the failure. The failed resource may not be released by the virtualized infrastructure manager 130 in step S315 (see FIG. 6), and the orchestrator 110 may instruct the resource management unit 131 to release the failed resource after the notification indicating that the securing of the resource fails is received (see step S317).

Supplementary Description of Network Service Generation Processing

In the description of FIGS. 6 and 7, because the reserved resource fails, the network service management apparatus 100 repeats the allocation and the reservation (steps S318 to S321) to generate and provide the service. When the resource fails again, the network service management apparatus 100 repeats the allocation and the reservation again. This corresponds to the repetition of steps S104, S105→Y, S106, S107, S108→N, and S114 of FIG. 4.

Modification Example: Network Service Correction Processing

When the resource requirements of the virtual network function are relaxed and the service is generated, the network service management apparatus 100 may reserve a resource at a point of time when the resource satisfying the original resource requirements is available, and may use the resource to correct the service.

Figure 10:
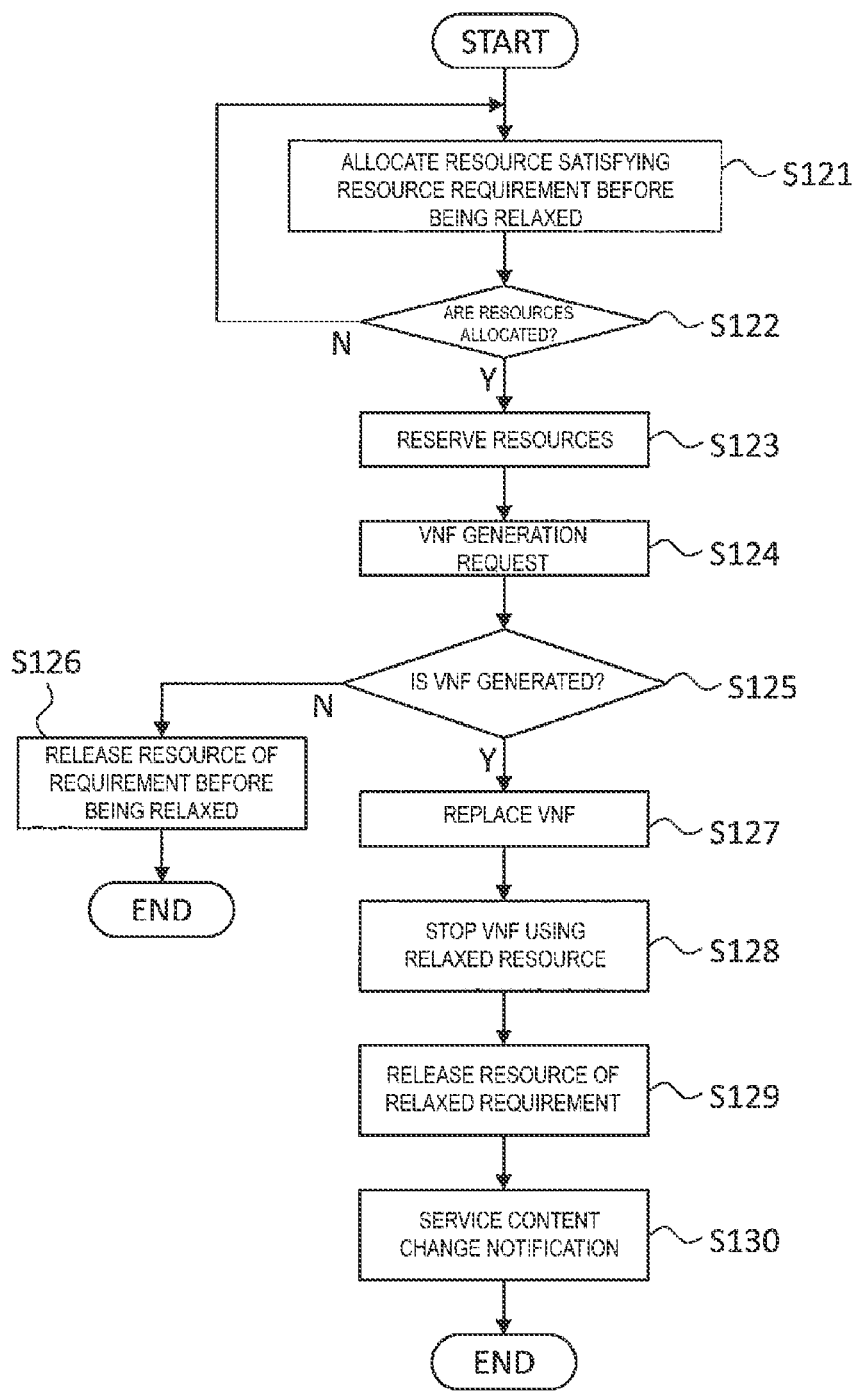
FIG. 10 is a flowchart of network service correction processing according to a modification example of the present embodiment.

FIG. 10 is a flowchart of network service correction processing according to a modification example of the present embodiment. The network service correction processing mainly executed by the orchestrator 110 will be described with reference to FIG. 10.

In step S121, the reserved resource candidate determination unit 115 allocates, for a virtual network function generated by relaxing resource requirements and allocating a resource, as a resource candidate of the virtual network function, an available resource satisfying the resource requirements before being relaxed which is the resource requirements of the virtual network function.

In step S122, the reserved resource candidate determination unit 115 proceeds to step S123 when the allocation of the resource candidate of step S121 succeeds (step S122→Y), and returns to step S121 when the allocation fails (step S122→N).

In step S123, the resource reservation request unit 116 requests the virtualized infrastructure manager 130 to reserve the resource candidate.

In step S124, the service generation request unit 117 requests the virtualized infrastructure manager 130 via the virtual network function manager 120 to allocate the reserved resource to the virtual network function and generate the virtual network function.

In step S125, the service generation unit 132 of the virtualized infrastructure manager 130 proceeds to step S127 when the securing of the resource succeeds and the generation of the virtual network function succeeds (step S125→Y), and proceeds to step S126 when the securing and the generation fail (step S125→N).

In step S126, the resource management unit 131 of the virtualized infrastructure manager 130 requests the virtualized infrastructure manager 130 to release the resource reserved in step S123.

In step S127, the service generation unit 132 replaces the existing virtual network function (activated in fallback state by using the resource satisfying the relaxed resource requirements) with the virtual network function newly generated in step S124.

For example, in the case of a virtual network function of a firewall connecting a virtual private network (VPN) and the Internet, the service generation unit 132 switches a connection destination to an external network of the VPN from the existing firewall to a newly generated firewall to replace the virtual network function. For example, in the case of a server using a virtual machine that provides a web service, the service generation unit 132 may perform migration of the virtual machine from existing resources to newly reserved resources to replace the virtual network function. For example, in the case of a server using a virtual machine constituting the cluster system, the service generation unit 132 may replace the existing server on standby to a newly generated server. In the case of a load balancing cluster, processing of an existing server may be stopped, and may be replaced with a newly generated server.

In step S128, the service generation unit 132 stops the virtual network function (activated in fallback state by using the resource satisfying the relaxed resource requirements).

In step S129, the resource management unit 131 releases the resource used by the virtual network function stopped in step S128.

In step S130, the service request reception and reply unit 111 notifies the service requester that the resource used by the network service is replaced.

Features of Network Service Correction Processing

By performing the network service correction processing, the resource used by the virtual network function by relaxing the resource requirements and the constraint conditions requested by the virtual network function can be replaced with the resource satisfying the original resource requirements and constraint conditions. Thus, the network service management apparatus 100 can provide the network services satisfying the original performance and quality to the service requester.

The network service management apparatus 100 replaces only the virtual network function for which the resource is changed among the virtual network functions constituting the network service. Thus, the network service management apparatus 100 can correct the network service satisfying the original performance and quality without stopping the network service.

In the above-described modification example, the network service management apparatus 100 corrects the service at a point of time at which the resource of the resource requirements originally required in the virtual network function constituting the network service requested by the service request is available. In contrast, the network service management apparatus 100 may correct the service at a point of time at which the resource of the resource requirements having a small degree of relaxation is available rather than the resource requirements originally required.

Modification Example. Adjustment Policy

As described in step S110, the adjustment policy reduces the performance and capacity of the resource. For example, the adjustment policy reduces the number of CPU cores and the storage capacity, reduces the band of the virtual network, and reduces the number of virtual network functions when there is the plurality of virtual network functions of the identical type in the load balancing cluster system. The performance and capacity are gradually reduced until the resource is allocated. A lower limit of the resource is set for the virtual network function. When the resource reaches the lower limit, the network service management apparatus 100 fails to allocate the resource.

As an adjustment policy different from the adjustment policy that gradually reduces the performance and capacity, the network service management apparatus 100 may adopt an adjustment policy that reduces the performance and capacity of the resource matching a usage situation while referring to the resource usage situation (statistical information) of the virtual network function of the identical type in the past. For example, when an average usage of the CPU is 30%, the network service management apparatus 100 may reduce the number of CPU cores from four to two instead of gradually reducing the number of CPU cores from four to three, two, and one, and may fail to allocate the resource when the resource cannot be reserved by two CPU cores. When the virtual network function of the identical type is provided to the identical user repeatedly, the network service management apparatus 100 may reduce the performance and capacity of the resource matching the usage situation while referring to the statistical information of the virtual network function of the identical type limited to the user. By adopting the adjustment policy based on the statistical information, the network service management apparatus 100 can allocate the resource at a time shorter than a time of the adjustment policy that gradually reduces the performance and capacity, and can shorten the lead time.

As another adjustment policy, the network service management apparatus 100 may adopt the adjustment policy that relaxes the resource to the minimum resource required for the virtual network function when the allocation of the resource of the virtual network function fails. If this adjustment policy is adopted, the network service management apparatus 100 can further reduce the amount of resources to be allocated (the performance and/or capacity of the resource) as compared with the adjustment policy that gradually reduces the performance and capacity and the adjustment policy that relaxes the resource while referring to the statistical information, and can increase the number of generable virtual network functions and the number of providable network services.

The network service management apparatus 100 may use the plurality of adjustment policies described above depending on the situation. For example, when the latest lead time for a predetermined period of time exceeds a predetermined threshold value, the adjustment policy that relaxes the resource while referring to the statistical information may be adopted instead of the adjustment policy that gradually reduces the performance and capacity. By switching between the adjustment policies, the network service management apparatus 100 can provide the service while balancing a reduction in the lead time and a service quality improvement including the performance and capacity of the resource.

The network service management apparatus 100 may adopt the adjustment policy that relaxes the resource while referring to the statistical information instead of the adjustment policy that gradually reduces the performance and capacity when the number of free resources on the network functions virtualization infrastructure 140 is less than a predetermined threshold value. The network service management apparatus 100 may set a smaller predetermined threshold value, and may switch the adjustment policy to the adjustment policy that relaxes the resource to the required minimum resource when the number of free resources is less than this threshold value. By switching the adjustment policy so as to reduce the amount of resources to be allocated (the performance and/or capacity of the resource) depending on the situation of the free resource, the network service management apparatus 100 can activate more virtual network functions with less resources and can provide more services.

In addition to the amount of free resources on the network functions virtualization infrastructure 140, the network service management apparatus 100 may switch the adjustment policy depending on the resource status such as a change status of the amount of free resources (such as an increase trend, a decrease trend, an increase or decrease speed, or the like), the amount of electrical usage for all the resources, and the like. The network service management apparatus 100 may switch the adjustment policy depending on the user (service requester).

Modification Example: Application Example Other Than Network Service Generation

In the aforementioned embodiment, in the processing of receiving the service request and generating the network service, the network service management apparatus 100 re-allocates the resource when the resource cannot be secured after the resource reservation, and relaxes the resource requirements to allocate the resource when the resource satisfying the resource requirements cannot be allocated. In addition to the generation of the network service, wien the virtual network function used for healing or scaling of the network service is activated, the network service management apparatus 100 may re-allocate the resource, or may relax the resource requirements and allocate the resource. The present invention is not limited to the network service constituted by the virtual network function, and the network service management apparatus 100 may re-allocate the resource, or may relax the resource requirements and allocate the resource in the service generation of a system (cloud system) that provides the service via the network.

Other Modification Examples

The components such as the orchestrator 110, the virtual network function manager 120, the virtualized infrastructure manager 130, and the like, and the processing contents described in the flowcharts and the sequence diagrams may be appropriately modified without departing from the spirit of the present invention.

REFERENCE SIGNS LIST

100 Network service management apparatus
110 Orchestrator
111 Service request reception and reply unit
112 Parameter verification and virtual network function extraction unit
113 Resource requirement and constraint condition inquiry unit
114 Resource requirement and constraint condition adjustment unit
115 Reserved resource candidate determination unit
116 Resource reservation request unit
117 Service generation request unit
120 Virtual network function manager
121 Resource requirement and constraint condition reading unit
130 Virtualized infrastructure manager
131 Resource management unit
132 Service generation unit
140 Network functions virtualization infrastructure

The invention claimed is:

1. A network service management apparatus that uses resources included in a network functions virtualization infrastructure to provide a network service, the network service management apparatus comprising:
   one or more computers; and
   one or more storage devices coupled with the one or more computers and storing instructions that, when executed by the one or more computers, cause the one or more computers to perform operations comprising:
      defining resources that satisfy a resource requirement of a virtual network function constituting the network service and are allocated to the virtual network function;
      making a first reservation of the resources that are defined;
      securing first resources including the resources reserved by the first reservation;
      activating the virtual network function on the first resources that are secured;
      generating the network service using the first resources;
      in response to failing to secure at least one resource among the resources reserved by the first reservation, releasing the at least one resource that failed to be secured;
      defining, for a virtual network function to which the at least one resource that failed to be secured is allocated, a new instance of resources that (i) satisfy a resource requirement of the virtual network function to which the at least one resource that failed to be secured is allocated and (ii) are allocated to the virtual network function to which the at least one resource that failed to be secured is allocated;
      making a second reservation of the new instance of resources;
      securing second resources including (i) the resources reserved by the first reservation other than the at least one resource that failed to be secured and (ii) the new instance of resources reserved by the second reservation;
      activating a virtual network function on the second resources that are secured; and
      generating the network service using the second resources.

2. The network service management apparatus according to claim 1, wherein the operations comprise cancelling
   a reservation of the resources for which the one or more computers fail to secure.

3. The network service management apparatus according to claim 1, wherein the operations comprise:
   in response to failing to secure at least one resource among the resources reserved by the second reservation, repeating
   a definition of the new instance of resources and a reservation of the new instance of resources until the one or more computers secure third resources;
   activating a virtual network function on the third resources that are secured; and
   generating the network service.

4. The network service management apparatus according to claim 1, wherein the operations comprise:

in response to that no resources satisfy the resource requirement of the virtual network function constituting the network service and are allocated to the virtual network function constituting the network service in the first reservation or the second reservation, changing the resource requirement of the virtual network function that does not have resources to be allocated according to a predetermined adjustment policy; and defining resources to be allocated to the virtual network function that does not have resources to be allocated.

5. The network service management apparatus according to claim 4, wherein the operations comprise switching depending on a situation of the resources included in the network functions virtualization infrastructure, between a plurality of adjustment policies for which values after performance and/or capacity of resources included in the resource requirement of the virtual network function constituting the network service are changed are different.

6. The network service management apparatus according to claim 4, wherein the operations comprise for a virtual network function activated in a fallback state that indicates a virtual network function to which resources are allocated based on the resource requirement that is changed, in response to that new resources indicating resources that satisfy the resource requirement prior to change of the virtual network function activated in fallback state are allocable to the virtual network function activated in fallback state, reserving the new resources;

securing the new resources;

activating a virtual network function on the new resources that are secured; and replacing the virtual network function activated in fallback state with the virtual network function activated on the new resources.

7. A network service management method of a network service management apparatus that uses resources included in a network functions virtualization infrastructure to provide a network service, the network service management apparatus comprising one or more computers and one or more storage devices coupled with the one or more computers and storing instructions that, when executed by the one or more computers, cause the one or more computers to perform the network service management method comprising:

defining resources that satisfy a resource requirement of a virtual network function constituting the network service and are allocated to the virtual network function;

making a first reservation of the resources that are defined;

securing first resources including the resources reserved by the first reservations;

activating the virtual network function on the first resources that are secured; and generating the network service using the first resources;

in response to failing to secure at least one resource among the resources reserved by the first reservation, releasing the at least one resource that failed to be secured;

defining, for a virtual network function to which the at least one resource that failed to be secured is allocated, a new instance of resources that (i) satisfy a resource requirement of the virtual network function to which the at least one resource that failed to be secured is allocated and (ii) are allocated to the virtual network function to which the at least one resource that failed to be secured is allocated;

making a second reservation of the new instance of resources;

securing second resources including (i) the resources reserved by the first reservation other than the at least one resource that failed to be secured and (ii) the new instance of resources reserved by the second reservations;

activating a virtual network function on the second resources that are secured; and generating the network service using the second resources.

8. A non-transitory computer-readable medium comprising a network service management program for causing a computer to function as a network service management apparatus comprising:

one or more computers; and one or more storage devices coupled with the one or more computers and storing instructions that, when executed by the one or more computers, cause the one or more computers to perform operations comprising:

defining resources that satisfy a resource requirement of a virtual network function constituting a network service and are allocated to the virtual network function;

making a first reservation of the resources that are defined;

securing first resources including the resources reserved by the first reservations;

activating the virtual network function on the first resources that are secured;

generating the network service using the first resources;

in response to failing to secure at least one resource among the resources reserved by the first reservation, releasing the at least one resource that failed to be secured;

defining, for a virtual network function to which the at least one resource that failed to be secured is allocated, a new instance of resources that (i) satisfy a resource requirement of the virtual network function to which the at least one resource that failed to be secured is allocated and (ii) are allocated to the virtual network function to which the at least one resource that failed to be secured is allocated;

making a second reservation of the new instance of resources;

securing second resources including (i) the resources reserved by the first reservation other than the at least one resource that failed to be secured and (ii) the new instance of resources reserved by the second reservations;

activating a virtual network function on the second resources that are secured; and generating the network service using the second resources.

* * * * *